United States Patent
Guddanti et al.

(10) Patent No.: US 10,223,234 B2
(45) Date of Patent: Mar. 5, 2019

(54) MONITORING A WEB APPLICATION USING AN OUTSIDE-IN STRATEGY

(71) Applicant: Microsoft Technology Licensing, LLC, Redmond, WA (US)

(72) Inventors: Swapna Guddanti, Bothell, WA (US); Sapan Sarvaiya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 211 days.

(21) Appl. No.: 15/237,552

(22) Filed: Aug. 15, 2016

(65) Prior Publication Data

US 2018/0046517 A1 Feb. 15, 2018

(51) Int. Cl.
*G06F 9/46* (2006.01)
*G06F 11/34* (2006.01)

(52) U.S. Cl.
CPC .................................... *G06F 11/34* (2013.01)

(58) Field of Classification Search
None
See application file for complete search history.

(56) References Cited

U.S. PATENT DOCUMENTS

| | | | |
|---|---|---|---|
| 8,433,749 B2 | 4/2013 | Wee et al. | |
| 8,447,851 B1 | 5/2013 | Anderson et al. | |
| 8,719,804 B2 | 5/2014 | Jain | |
| 8,819,701 B2 | 8/2014 | Wheeler et al. | |
| 8,996,932 B2 | 3/2015 | Singh et al. | |
| 9,207,993 B2 * | 12/2015 | Jain | G06F 9/5094 |
| 2003/0135509 A1 | 7/2003 | Davis et al. | |
| 2010/0251242 A1 | 9/2010 | Sivasubramanian et al. | |
| 2011/0055378 A1 | 3/2011 | Ferris et al. | |
| 2012/0167081 A1 | 6/2012 | Sedayao et al. | |
| 2012/0221690 A1 | 8/2012 | Beaty et al. | |
| 2013/0007261 A1 | 1/2013 | Dutta et al. | |
| 2013/0007265 A1 | 1/2013 | Benedetti et al. | |
| 2014/0075013 A1 | 3/2014 | Agrawal et al. | |
| 2014/0149784 A1 | 5/2014 | Ngo et al. | |
| 2014/0282586 A1 * | 9/2014 | Shear | G06F 9/5072 718/104 |
| 2016/0188377 A1 * | 6/2016 | Thimmappa | G06F 9/5083 718/104 |
| 2016/0212052 A1 * | 7/2016 | Zaidi | H04L 47/193 |

OTHER PUBLICATIONS

Perkins, Benjamin, "Monitoring your multiple Azure Web App instances," available at <<https://blogs.msdn.microsoft.com/waws/2015/11/03/monitoring-your-multiple-azure-web-app-instances/>, Microsoft Developer, Microsoft Corporation, Redmond, WA, published on Nov. 3, 2015, 2 pages.
Part II: Additional Information, in Statement Filed Pursuant to the Duty of Disclosure Under 37 C.F.R. §§ 1.56, 1.97 and 1.98, submitted on Aug. 15, 2016 in U.S. Appl. No. 15/237,552, 3 pages.

* cited by examiner

*Primary Examiner* — Kenneth Tang
(74) *Attorney, Agent, or Firm* — Rainier Patents, P.S.

(57) ABSTRACT

A computer-implemented technique is described herein for monitoring a web application that runs on plural computing machines provided by a network-accessible system. The technique involves determining a set of application instances that are assessed as healthy by the system, generating addresses for those application instances, and then testing the application instances in the set using their respective addresses. Overall, the technique can be considered to employ an "outside-in" strategy insofar as it interacts with the system from the vantage point of an end user.

20 Claims, 4 Drawing Sheets

MONITORING A WEB APPLICATION USING AN OUTSIDE-IN STRATEGY

BACKGROUND

A network-accessible system commonly implements a web application using a plurality of application instances, provided by a plurality of computing devices. A load balancer directs an end user's request to one of the application instances based on any selection strategy, such as a round-robin selection strategy.

An administrator will typically conduct one or more tests on the system to ensure that it is providing acceptable service to its end users. Known tests, however, are labor intensive and sometimes inconclusive.

SUMMARY

A computer-implemented technique is described herein for monitoring a web application that runs on plural computing machines provided by a network-accessible system. In one implementation, the technique involves: (a) determining a count of application instances that are running a particular application, associated with a first set of application instances; (b) determining a second set of application instances, from among the first set of application instances, that pass an internal load balancer accessibility test; and (c) generating respective addresses (e.g., URL addresses) associated with the application instances in the second set. Each address provides identifying information by which an entity, external to the system, can directly access a particular application instance within the system.

The technique then involves: (d) sending test messages to the application instances in the second set of application instances, based on the addresses provided in the address-generating operation, and by bypassing the load balancer; (e) receiving replies to the test messages from the application instances; (f) based on the replies, determining a third set of application instances, from among the second set of application instances, that fail an application-specific test; and (g) outputting a representation of the third set of application instances for use in taking corrective action with respect to the third set of application instances. Overall, the technique can be considered to employ an "outside-in" strategy because it interacts with the system from a vantage point external to the system, e.g., from the vantage point of an end user.

According to another illustrative aspect, the technique performs operations (a) and (b) by accessing interfaces (e.g., custom web pages) provided by the system. These interfaces expose instance count information and load balancer accessibility information.

According to another illustrative aspect, each address that is generated corresponds to a Uniform Resource Locator (URL), in conjunction with a port identifier associated with a particular application instance.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter. For instance, other implementations can perform the operations specified above in a different order, compared to the order specified above.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented environment that implements the features described herein. Section B sets forth illustrative methods which explain the operation of the environment of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

Figure 1:
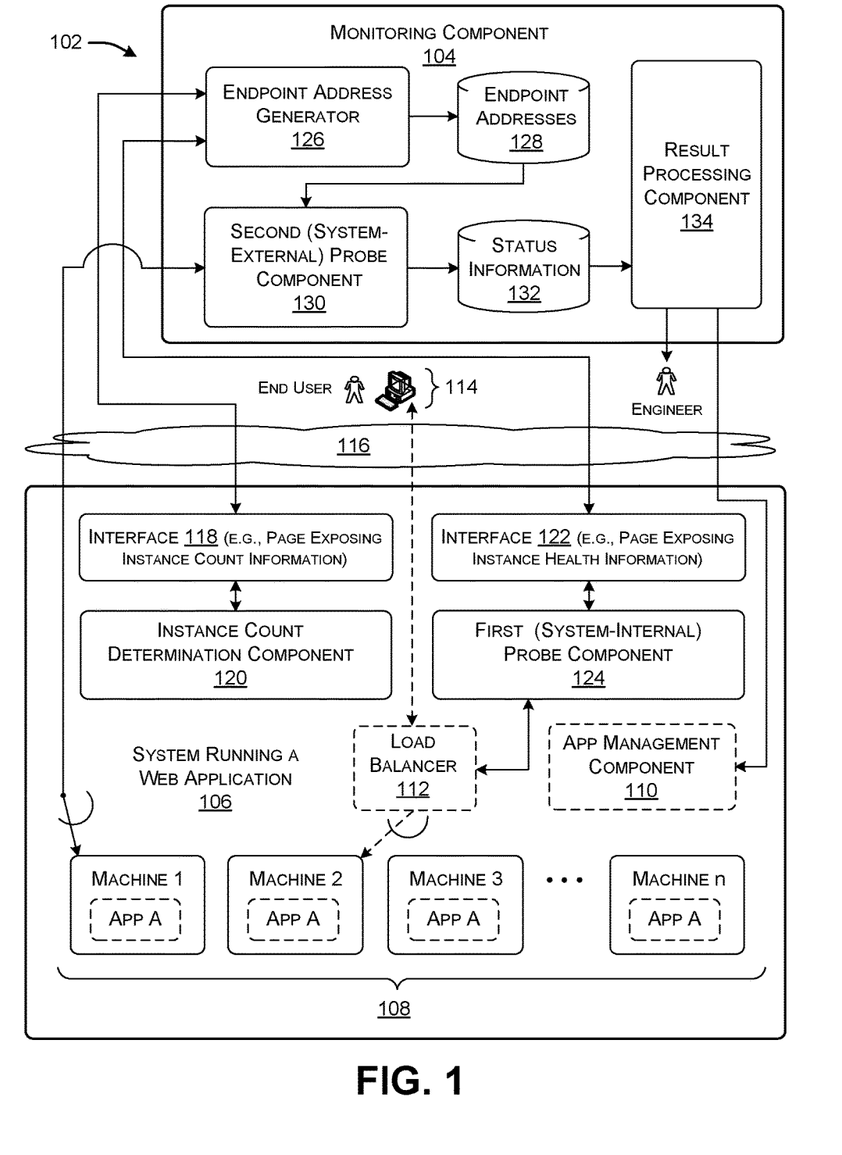
FIG. 1 shows an illustrative environment by which a monitoring component tests a web application running on machines provided by a network-accessible system.

FIG. 1 shows an environment 102 that includes a monitoring component 104 and a network-accessible system 106. The monitoring component 104 assesses, at a given time, the ability of the system 106 to successfully deliver an application to end users, where success is measured with respect to the criteria described below. The monitoring component 104 operates using an "outside-in" strategy because it tests the system 106 from the vantage point an entity external to the system 106, such as the vantage point of an end user.

The system 106 includes a plurality of machines 108 for running at least one application. FIG. 1, for instance, shows that each of the machines 108 runs at least "App A." Each machine depicted in FIG. 1 may correspond to a virtual machine that is implemented by the resources of one or more underlying physical computing devices. Alternatively, or in addition, each machine may directly correspond to a physical server computing machine and/or any other processing component.

Generally, as used herein, an application instance refers to an instance of machine functionality that runs an application. For example, an application instance may correspond to an application running on a virtual machine or a physical server computing device. In one scenario, each application instance maps to a distinct virtual or physical machine, although this is not necessarily the case in all scenarios.

An application management component 110 dynamically chooses a number of application instances to run the application based on various considerations. For example, the application management component 110 can choose the number of application instances based on a current demand for the application by end users, the historical demand for the application with respect to the current time of day and day of week (and/or other contextual factors), and so on.

A load balancer 112 directs an end user's request directed to the application to one of the application instances running the application. The load balancer 112 can perform this selection in any manner, such as by successively selecting application instances in a given order of application instances, e.g., using a round-robin strategy. In addition, or alternatively, the load balancer 112 can select an application instance based on a consideration of the current load of its underlying machine.

In a normal production setting, the environment 102 operates as follows. An end user uses any computing device 114 to interact with the system 106 via any communication conduit 116. For instance, the user computing device 114 may correspond to a stationary personal computing device, a handheld computing device (such as a smartphone), a game console, etc. The communication conduit 116 may correspond to a wide area network (e.g., the Internet), a local area network, one or more point-to-point links, etc. The network may use any protocol or combination of protocols, such as the Transmission Control Protocol (TCP) and the Internet Protocol (IP).

More specifically, to access a particular application (e.g., App A), the user inputs a network address that is associated with the application. The network address may correspond to any Uniform Resource Indicator (URI), such as a Uniform Resource Locator (URL) address. The load balancer 112 receives the request and then directs it to one of the application instances, e.g., as provided by a specific virtual machine or physical machine. The selected application instance then provides a desired service to the end user.

The system 106 is also customized to expose certain information for use by the monitoring component 104. For example, a first interface 118 exposes information regarding a number of active application instances that are currently running the application. More specifically, the first interface 118 generates count information based on information supplied by an instance count determination component 120. The instance count determination component 120, in turn, can consult the application management component 110 to determine the number of application instances that are active and running the application (App A) at the current time.

In one implementation, the first interface 118 can correspond to a web page associated with a particular address, e.g., a particular URL. The monitoring component 104 can access the count information provided by the first interface 118 by accessing its URL. More specifically, the first interface 118 can provide the count information on demand, e.g., when that information is requested by the monitoring component 104. In other implementations, the first interface 118 can be implemented using some other technology, such as an Application Programming Interface (API).

A second interface 122 exposes information regarding whether a particular application instance is accessible to the load balancer 112. More specifically, the second interface 122 can generate the load balancer accessibility information based on information supplied by a first probe component 124. The first probe component 124, in turn, can determine the status of a particular application instance by requesting the load balancer 112 to send a system message to the particular application instance. The first probe component 124 determines that the application instance is healthy (and "in rotation") when it responds to the system message within a prescribed time. It is deemed unhealthy otherwise. Note that the testing performed by the first probe component 124 determines whether a machine that runs the application instance is accessible, but does not vouch for whether the application instance itself is providing its expected service to end users. Further note that the testing performed by the first probe component 124 can be considered internal to the system 106 since this operation measures the status of a particular part of the system 106, using a testing channel that is internal to the system 106.

Like the first interface 118, the second interface 122 can corresponds to a web page associated with a particular address, e.g., a particular URL. The monitoring component 104 can access the load balancer accessibility information provided by the second interface 122 by accessing its URL. The first probe component 124 generates the requested accessibility information in an on-demand basis, e.g., when requested by the monitoring component 104. In other implementations, the second interface 122 can be implemented using some other technology, such as an API.

Now referring to the monitoring component 104, the monitoring component 104 as a whole can be implemented by one or more computing devices. For instance, the monitoring component 104 may correspond to a personal computing device or server computing device, under the control of an administrator assigned to the system 106. The monitoring component 104 can perform its tests on any basis, such as on a periodic basis, on an event-driven basis, and/or on an on-demand basis (e.g., when specifically instructed by the administrator).

The monitoring component 104 includes an endpoint address generator 126 for generating addresses associated with the application instances. To do so, the endpoint address generator 126 first accesses the first interface 118 provided by the system 106 to identify a number n of application instances that are currently configured to run the application. This number of application instances is associated with a first set of application instances. For example, assume that the first interface 118 indicates that there are 200 application instances currently running App A.

The endpoint address generator 126 can then query the second interface 122 for each application instance in the first set of application instances. In response, the second interface 122 provides, in on-demand fashion, an indication of whether the load balancer 112 can successfully access the application instance. The endpoint address generator 126 compiles a second set of application instances, from among the first set of application instances, that are considered healthy from the standpoint of the first probe component 124. For example, assume that the endpoint address generator 126 concludes that 175 application instances, from among the 200 application instances running the application, are healthy, meaning that they are accessible to the load balancer 112.

The endpoint address generator 126 then generates respective addresses associated with the application instances in the second set of application instances. Each address provides identifying information by which an entity, external to the system, can access a particular application instance within the system. Each address can correspond to any type of URI. More specifically, in one implementation, each address includes a base URL associated with the application, together with a port number associated with the particular application instance, e.g., as in "AppA-UserPage.aspx/1," where the "1" port suffix identifies a first application instance. Another address, associated with another application instance, includes the same base URL together with a port number associated with that other application instance, e.g., as in "AppA-UserPage.aspx/2," where the "2" suffix identifies a second application instance. A data store 128 stores information regarding the addresses of the second set of application instances, provided by the endpoint address generator 126.

The endpoint address generator 126 can also identify names for the different application instances in the second set, such as AppA-Instance1, AppA-Instance2, etc. These names provide a way of later referencing specific application instances that are determined to be unhealthy.

A second probe component 130 then sends test messages to the application instances in the second set of application instances over the communication conduit 116, based on the addresses provided by the generating operation. For instance, the second probe component 130 sends a test message to the first application instance using an endpoint address associated with the first application instance, e.g., AppA-UserPage.aspx/1. In doing so, the second probe component 130 bypasses the load balancer 112 because it directly targets a specific application instance.

Next, the second probe component 130 receives and processes replies to the test messages from the application instances. More specifically, in one implementation, a test message sent to a particular application instance requests that instance to provide particular information, the correct value of which is known in advance by the second probe component 130. Upon receiving the particular information returned by the application instance, the second probe component 130 compares the received information with the correct value. The second probe component 130 determines that the application instance is unhealthy when: (a) no reply is received from the application instance within a specified amount of time; or (b) the information that is received is different than the expected correct value. The test performed by the second probe component 130 can be considered application-specific in nature because it involves interaction with a specific application, e.g., a specific page of App A.

Overall, the second probe component 130 determines a third set of application instances, from among the second set of application instances, that are deemed unhealthy because they fail the above-described application-specific test. The second probe component 130 stores information regarding the third set of application instances in a data store 132. The information regarding the third set of application instances can identify the application instances using the instance names provided by the endpoint address generator 126. Assume, for example, that the third set identifies 50 application instances that are considered unhealthy, out of the 175 application instances that are tested.

A result processing component 134 outputs a representation of the third of application instances for use in taking corrective action with respect to those application instances. For instance, in one case, the result processing component 134 determines whether the number of application instances in the third set of application instances is above a prescribed environment-specific threshold, such as, without limitation, 30% of the application instances that are tested by the second probe component 130. If the threshold is exceeded, the result processing component 134 can output a listing of the third set of application instances to at least one human worker. The worker can then use the list to take corrective action with respect to the third set of application instances. That is, the worker can manually determine that the reason(s) that the third set of application instances are not providing the expected application service, and then manually make changes to remedy whatever problem(s) are discovered.

Alternatively, or in addition, the result processing component 134 again determines whether the number of application instances in the third set is above the prescribed environment-specific threshold. If so, the result processing component 134 can output a list of the third set of application instances to the application management component 110. The application management component 110 can then automatically make corrective changes to the system 106. For instance, the application management component 110 can bring additional application instances online to run the application, to thereby compensate for the faulty application instances. Alternatively, or in addition, the application management component 110 can perform automatic diagnostics on the system 106 to determine reason(s) that the third set of application instances are not provided the expected application service; the application management component 110 can then automatically make changes to remedy whatever problem(s) are discovered. Such automated troubleshooting can operate by applying an interrelated collection of IF-THEN rules that defines a troubleshooting flow, or by applying other heuristic techniques.

Overall, the monitoring component 104 performs application-specific testing of the application instances from a vantage point of any entity that is external to the system, referred to herein as an outside-in strategy. This strategy is beneficial in comparison to monitoring conducted solely on the basis of internal system tests. This is because an internal system test may indicate that an application instance is providing acceptable service to end users, when, in fact, it is not. For example, the first probe component 124 may falsely indicate that a application instance is accessible to the load balancer 112, but that application instance may nevertheless fail to provide acceptable service with respect to the particular application which it runs, for any number of application-specific reasons. The monitoring component 104 can overcome these false assurances of healthy operation by automatically generating endpoint addresses associated with the application instances, and then sending test messages directly to the application instances in the system 106. Further, the monitoring component 104 is most likely to expose problems that may affect end users because it uses an access path that mirrors the manner in which end users interact with the application.

The monitoring component 104 also sends the test messages in a way that bypasses the load balancer 112. By doing so, the monitoring component eliminates the ambiguity that the load balancer 112 may otherwise introduce into a testing regimen. For example, consider the alternative case in which a monitoring component sends a plurality of test messages to the load balancer 112, upon which the load balancer would distribute these test messages to the application instances. The replies provided by the application instances may provide an indication of the health of the set of application instances as a whole, but may provide a less clear understanding of the health of any particular application instance. The monitoring component 104 overcomes this problem by directly probing each individual application instance without the influence of the load balancer 112.

The monitoring component 104 also provides a technique for quickly providing diagnostic results. This is because the monitoring component 104 collects information using reliable web requests, e.g., by first making requests to the first and second interfaces (118, 122) to collect preparatory information for use in identifying a collection of application instances, and then sending a series of test messages to the identified application instances. In contrast, a system-centric testing regimen may rely on privileged backend system channels that are subject to failure.

The monitoring component 104 can leverage the efficiency of its technique by repeating its testing on a frequent basis. This strategy provides the ability to quickly alert a system administrator to problems in the delivery of an application. The administrator may then quickly make changes to the system 106 to reduce the impact of the problems on end users. As a further result, the end users will enjoy reliable access to the application.

B. Illustrative Processes

Figure 2:
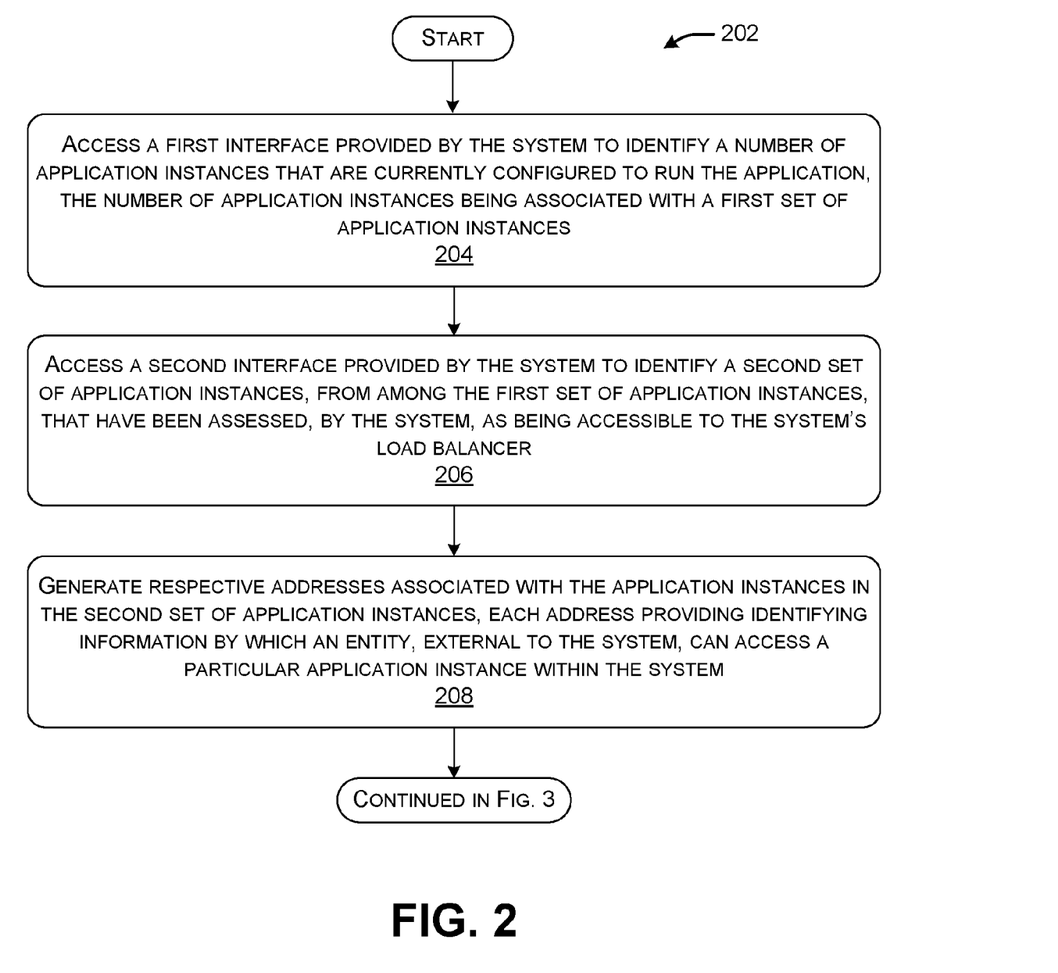
FIGS. 2 and 3 show one implementation of the monitoring component of FIG. 1.
Figure 3:
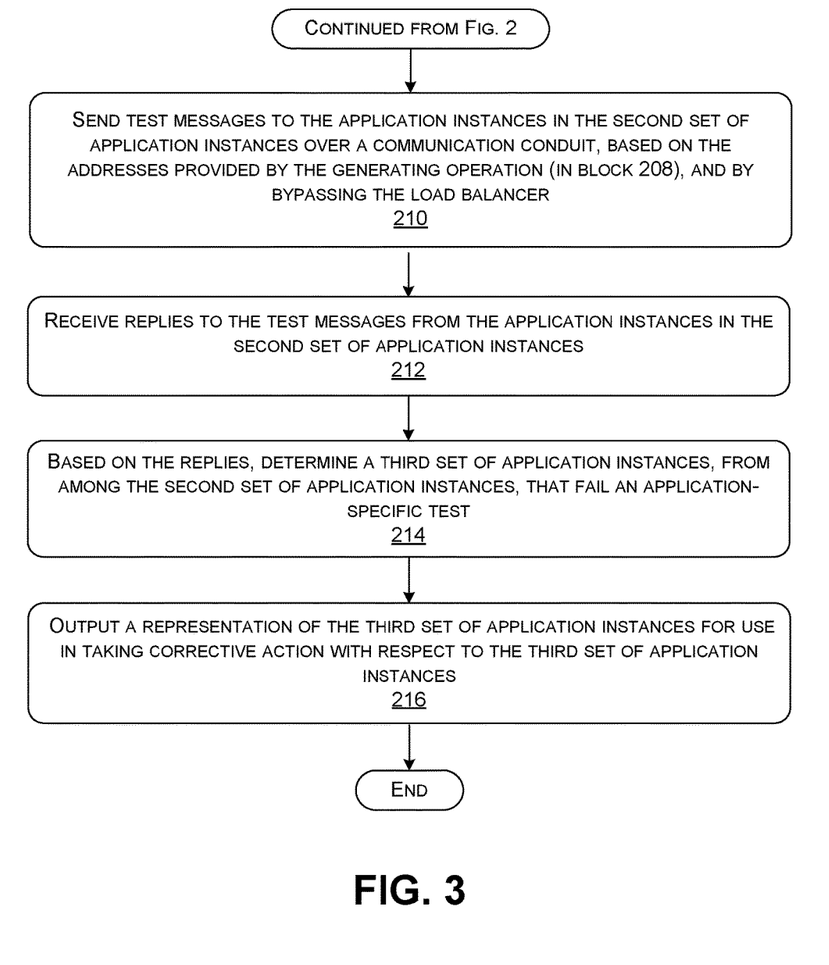

FIGS. 2 and 3 together show a process 202 that explains the operation of the environment 102 of Section A in flowchart form. Since the principles underlying the operation of the environment 102 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

In block 204 the monitoring component 104 accesses the first interface 118 provided by the system 106 to identify a number of application instances that are currently configured to run an application. That number of application instances is associated with a first set of application instances. In block 206, the monitoring component 104 accesses the second interface 122 provided by the system 106 to identify a second set of application instances, from among the first set of application instances, that have been assessed, by the system 106, as being accessible to the load balancer 112 in a prescribed manner. In block 208, the monitoring component 104 generates respective addresses associated with the application instances in the second set of application instances. Each address provides identifying information by which an entity, external to the system, can access the a particular application instance within the system 106.

Advancing to FIG. 3, in block 210, the monitoring component 104 sends test messages to the application instances in the second set of application instances over a communication conduit, based on the addresses provided by in block 208. The path over which the test messages are delivered bypasses the load balancer 112. In block 212, the monitoring component 104 receives replies to the test messages from the application instances in the second set of application instances. In block 214, based on the replies, the monitoring component 104 determines a third set of application instances, from among the second set of application instances, that fail an application-specific test. In block 216, the monitoring component outputs a representation of the third set of application instances for use in taking corrective action with respect to the third set of application instances.

C. Representative Computing Functionality

Figure 4:
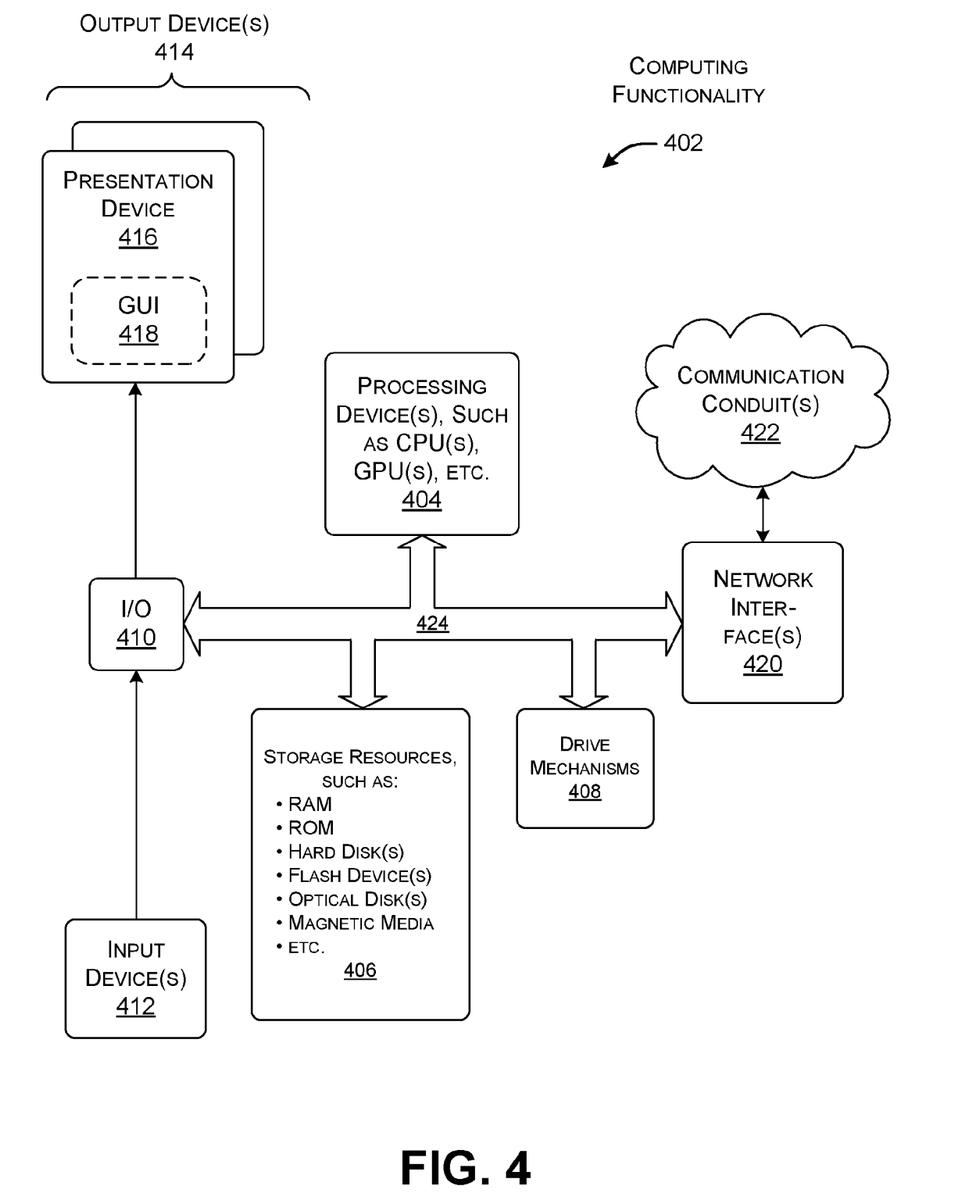
FIG. 4 shows illustrative computing functionality that can be used to implement any aspect of the features shown in the foregoing drawings.

FIG. 4 shows computing functionality 402 that can be used to implement any aspect of the mechanisms set forth in the above-described figures. For instance, the type of computing functionality 402 shown in FIG. 4 can be used to implement a computing device which provides the monitoring component 104. In another interpretation, the type of computing functionality 402 shown in FIG. 4 can be used to implement each server computing device within the network-accessible system 106. Generally note that the set of features described in FIG. 4 is illustrative, and that any particular manifestation of the computing functionality 402 can omit one or more of the features shown in FIG. 4, and/or add one or more features that are not illustrated in FIG. 14. In all cases, the computing functionality 402 represents one or more physical and tangible processing mechanisms.

The computing functionality 402 can include one or more hardware processor devices 404, such as one or more central processing units (CPUs), and/or one or more graphical processing units (GPUs), and so on. The computing functionality 402 can also include any storage resources (also referred to as computer-readable storage media or computer-readable storage medium devices) 406 for storing any kind of information, such as machine-readable instructions, settings, data, etc. Without limitation, for instance, the storage resources 406 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 402. The computing functionality 402 may perform any of the functions described above when the hardware processor device(s) 404 carry out computer-readable instructions stored in any storage resource or combination of storage resources. For instance, the computing functionality 402 can perform the process 202 when the hardware processor device(s) 404 carry out computer-readable instructions associated with the respective blocks in FIGS. 2 and 3. The computing functionality 402 also includes one or more drive mechanisms 408 for interacting with any storage resource, such as a hard disk drive mechanism, an optical disk drive mechanism, and so on.

The computing functionality 402 also optionally includes an input/output component 410 for receiving various inputs (via input devices 412), and for providing various outputs (via output devices 414). Illustrative input devices include a keyboard device, a mouse input device, a touchscreen input device, a digitizing pad, etc. One particular output mechanism may include a display device 416 and an associated graphical user interface presentation (GUI) 418. The display device 416 may correspond to a charge-coupled display device, a cathode ray tube device, a projection mechanism, etc. The computing functionality 402 can also include one or more network interfaces 420 for exchanging data with other devices via one or more communication conduits 422. One or more communication buses 424 communicatively couple the above-described components together.

The communication conduit(s) 422 can be implemented in any manner, e.g., by a local area computer network, a wide area computer network (e.g., the Internet), point-to-point connections, etc., or any combination thereof. The communication conduit(s) 422 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 402 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a method for monitoring an application provided by a network-accessible system is described herein. The system includes a plurality of machines running an application accessible via a load balancer. The method includes: accessing a first interface provided by the system to identify a number of application instances that are currently configured to run the application, the number of application instances being associated with a first set of instances; accessing a second interface provided by the system to identify a second set of application instances, from among the first set of application instances, that have been assessed, by the system, as being accessible to the load balancer; and generating respective addresses associated with the application instances in the second set of application instances, each address providing identifying information by which an entity, external to the system, can access a particular application instance within the system. The method also includes: sending test messages to the application instances in the second set of application instances over a communication conduit, based on the addresses provided by the above-referenced generating operation, and by bypassing the load balancer; receiving replies to the test messages from the application instances in the second set of application instances; based on the replies, determining a third set of application instances, from among the second set of application instances, that fail an application-specific test; and outputting a representation of the third set of application instances for use in taking corrective action with respect to the third set of application instances.

According to a second aspect, for at least some application instances, each application instance is implemented by a virtual machine, the virtual machine, in turn, being implemented by resources provided by one or more physical computing devices.

According to a third aspect, for at least some application instances, each application instance is directly implemented by a physical computing device.

According to a fourth aspect, the first interface corresponds to a web page that is accessible via an address associated with the web page.

According to a fifth aspect, the second interface corresponds to a web page that is accessible via an address associated with the web page.

According to a sixth aspect, the system determines whether an identified application instance is accessible to the load balancer by: sending, by the load balancer, a system message to the identified application instance; and determining whether the identified application instance is accessible to the load balancer based on whether a response to the system message is received from the identified application instance in a prescribed amount of time.

According to a seventh aspect, the above-referenced determining ascertains the availability of a machine that runs the identified application instance, without regard to whether the identified application instance is providing an expected service.

According to an eighth aspect, each address that is generated corresponds to a Uniform Resource Identifier (URI).

According to a ninth aspect, each address that is generated corresponds to a Uniform Resource Locator (URL), in conjunction with a port identifier associated with a particular application instance.

According to a tenth aspect, the above-referenced outputting includes: determining whether a number of application instances in the third set of application instances satisfies a prescribed threshold; and if the number of application instances in the third set of application instances satisfies the prescribed threshold, outputting a listing of the third set of application instances to at least one human worker, for use by the worker in taking corrective action with respect to the third set of application instances.

According to an eleventh aspect, the above-referenced outputting includes: determining whether a number of application instances in the third set of application instances satisfies a prescribed threshold; and if the number of application instances in the third set of application instances satisfies the prescribed threshold, outputting an indication of the third set of application instances to an application management component, for use by the application management component in automatically taking corrective action with respect to the third set of application instances.

According to a twelfth aspect, one or more computing devices are described that implement a monitoring component. The computing device(s) include an endpoint address generator configured to: determine a set of application instances provided by a network-accessible system that: (a) are running a particular application; and (b) have been determined, by the system, as being accessible to a load balancer provided by the system; and generate respective addresses associated with the application instances in the set of application instances, each address providing identifying information by which an entity, external to the system, can access a particular machine instance within the system. The computing device(s) also include an external probe component configured to: send test messages to the application instances in the set of application instances over a communication conduit, based on the addresses provided by the endpoint address generator, and by bypassing the load balancer; receive replies to the test messages from the application instances in the set of application instances; and based on the replies, determine a subset of application instances, from among the set of application instances, that fail an application-specific test. The computing device(s) also include a result processing component configured to output a representation of the subset of application instances for use in taking corrective action with respect to the subset of application instances.

According to a thirteenth aspect, for at least some application instances, each application instance is implemented by a virtual machine, the virtual machine, in turn, being implemented by resources provided by one or more physical computing devices.

According to a fourteenth aspect, for at least some application instances, each application instance is directly implemented by a physical computing device.

According to a fifteenth aspect, the endpoint address generator is configured to determine the set of application instances by: accessing a first interface provided by the system to identify a number of application instances that are currently configured to run the application, the number of application instances being associated with a first set of application instances; and accessing a second interface provided by the system to identify a second set of application instances, selected from among the first set of application instances, that have been internally assessed, by the system, as being accessible to the load balancer.

According to a sixteenth aspect, each of the first interface and the second interface corresponds to a web page that is accessible via an address associated with the web page.

According to a seventeenth aspect, each address that is generated corresponds to a Uniform Resource Identifier (URI).

According to an eighteenth aspect, wherein each address that is generated corresponds to a Uniform Resource Locator (URL), in conjunction with a port identifier associated with a particular application instance.

According a nineteenth aspect, an environment is described that is implemented by one or more computing devices. The environment includes a network-accessible system and a monitoring component. The network-accessible system include: a plurality of application instances running an application using a plurality of machines; a load balancer for distributing requests by end users to the plurality of application instances; a first interface that exposes information regarding a number of application instances that are currently configured to run the application at a given time; and a second interface that exposes information regarding whether each of the application instances in the system is accessible to the load balancer. The monitoring component includes an endpoint address generator configured to: determine, based on interaction with the first interface and the second interface, a set of application instances that: (a) are running the application; and (b) have been determined, by the system, as being accessible to the load balancer; and generate respective addresses associated with the application instances in the set of application instances, each address providing identifying information by which an entity, external to the system, can access a particular application instance within the system. The monitoring component also includes an external probe component configured to: send test messages to the application instances in the set of application instances over a communication conduit, based on the addresses provided by the endpoint address generator, and by bypassing the load balancer; receive replies to the test messages from the application instances in the set of application instances; and based on the replies, determine a subset of application instances, from among the set of application instances, that fail an application-specific test. The monitoring component also includes a result processing component configured to output a representation of the subset of application instances for use in taking corrective action with respect to the subset of application instances.

According to a twentieth aspect, each address that is generated corresponds to a Uniform Resource Locator (URL), in conjunction with a port identifier associated with a particular application instance.

A twenty-first aspect corresponds to any combination (e.g., any permutation or subset) of the above-referenced first through twentieth aspects that is not logically incompatible.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:

accessing a first interface to identify a first set of application instances that are configured to run an application, the first set of application instances being balanced by a load balancer;

accessing a second interface to identify a second set of application instances, from among the first set of application instances, that are accessible to the load balancer;

generating external addresses associated with the respective application instances in the second set of application instances, the external addresses enabling an external entity to bypass the load balancer and access the respective application instances, the external entity being external to the load balancer and the first set of application instances;

sending test messages to the application instances in the second set of application instances over a communication conduit using the external addresses and bypassing the load balancer;

receiving replies to the test messages from certain application instances in the second set of application instances;

based at least on the replies, determining a third set of application instances, from among the second set of application instances, that failed to reply to the test messages; and outputting a representation of the third set of application instances.

2. The method of claim 1, wherein at least one application instance in the first set of application instances is implemented by a virtual machine, the virtual machine, in turn, being implemented by resources provided by one or more physical computing devices.

3. The method of claim 1, wherein at least one application instance in the first set of application instances is directly implemented by a physical computing device.

4. The method of claim 1, wherein the first interface corresponds to a web page that is accessible via a web address associated with the web page.

5. The method of claim 1, wherein the second interface corresponds to a web page that is accessible via a web address associated with the web page.

6. The method of claim 1, further comprising:

determining the second set of application instances by:

sending accessibility messages to the first set of application instances; and determining which of the application instances in the first set of application instances respond to the accessibility messages in a prescribed amount of time.

7. The method of claim 6, wherein the determining ascertains the availability of a machine that runs a particular application instance, without regard to whether the particular application instance is providing an expected service.

8. The method of claim 1, wherein the external addresses correspond to Uniform Resource Identifiers (URIs).

9. The method of claim 1, wherein the external addresses correspond to Uniform Resource Locators (URLs) with port identifiers associated with the application instances in the second set of application instances.

10. The method of claim 1, further comprising:

determining whether a number of application instances in the third set of application instances satisfies a prescribed threshold; and responsive to determining that the number of application instances in the third set of application instances satisfies the prescribed threshold, outputting a listing of the third set of application instances to at least one human worker.

11. The method of claim 1, further comprising:

determining whether a number of application instances in the third set of application instances satisfies a prescribed threshold; and responsive to determining that the number of application instances in the third set of application instances satisfies the prescribed threshold, outputting an indication of the third set of application instances to an application management component.

12. A system, comprising:

one or more hardware processors; and at least one computer-readable storage medium having instructions which, when executed by the one or more hardware processors, cause the one or more hardware processors to:

determine a set of application instances running an application, the set of application instances being balanced by a load balancer and accessible to the load balancer;

generate external addresses that provide an external entity access to respective application instances in the set of application instances by bypassing the load balancer, the external entity being external to the load balancer and the set of application instances;

send test messages to the application instances in the set of application instances over a communication conduit using the external addresses and bypassing the load balancer;

receive replies to the test messages from certain application instances in the set of application instances;

based at least on the replies, determine a subset of application instances, from among the set of application instances, that failed to reply to the test messages; and output a representation of the subset of application instances.

13. The system of claim 12, wherein at least one application instance is implemented by a virtual machine, the virtual machine, in turn, being implemented by resources provided by one or more physical computing devices.

14. The system of claim 12, wherein at least one application instance is directly implemented by a physical computing device.

15. The system of claim 12, wherein the instructions further cause the one or more hardware processors to:

access an interface to identify the set of application instances.

16. The system of claim 15, wherein the interface corresponds to a web page that is accessible via a web address associated with the web page.

17. The system of claim 12, wherein the external addresses correspond to Uniform Resource Identifiers (URIs).

18. The system of claim 12, wherein the external addresses correspond to Uniform Resource Locators (URLs) with port identifiers associated with the application instances in the set of application instances.

19. An environment, comprising:

an application system including:

a first set of application instances configured to run an application;

a load balancer for balancing the first set of application instances by distributing requests by end users to the first set of application instances;

a first interface that exposes information regarding the first set of application instances; and a second interface that exposes information regarding a second set of application instances, from among the first set of application instances, that are accessible to the load balancer; and an application monitoring system including:

one or more hardware processors; and at least one computer-readable medium having instructions which, when executed by the one or more hardware processors, cause the one or more hardware processors to:

determine, based at least on interaction with the first interface and the second interface, the first set of application instances and the second set of application instances;

generate external addresses associated with respective application instances in the second set of application instances, the external addresses providing an entity, external to the application system, direct access to the respective application instances in the second set of application instances by bypassing the load balancer;

send test messages to the application instances in the second set of application instances over a communication conduit using the external addresses and bypassing the load balancer;

determine a third set of application instances, from among the second set of application instances, based at least on whether certain application instances in the second set of application instances reply to the test messages; and output a representation of the third set of application instances.

20. The environment of claim 19, wherein the external addresses correspond to Uniform Resource Locators (URLs) with port identifiers associated with the application instances in the second set of application instances.

\* \* \* \* \*